United States Patent [19]

Tanaka et al.

[11] Patent Number: 4,701,812
[45] Date of Patent: Oct. 20, 1987

[54] PCM RECORDING AND REPRODUCING APPARATUS

[75] Inventors: Kunimaro Tanaka; Minoru Ozaki, both of Hyogo, Japan

[73] Assignee: Mitsubishi Denki Kabushiki Kaisha, Tokyo, Japan

[21] Appl. No.: 745,833

[22] Filed: Jun. 18, 1985

Related U.S. Application Data

[63] Continuation-in-part of Ser. No. 438,552, Nov. 2, 1982, abandoned.

[51] Int. Cl.[4] .......................... G11B 5/09; G11B 27/02
[52] U.S. Cl. ......................................... 360/32; 360/13
[58] Field of Search ............... 360/32, 53, 13; 371/39, 371/44, 43

[56] References Cited

PUBLICATIONS

"On a Tape Format for Relizable PCM Multi-Channel Tape Recorders", Tanaka et al, A.E.S. 5/80.
"On PCM Multi-Channel Tape Recorder Using Powerful Code Format", Tanaka et al, A.E.S. 10/80.

Primary Examiner—Vincent P. Canney
Attorney, Agent, or Firm—Sughrue, Mion, Zinn, Macpeak & Seas

[57] ABSTRACT

A PCM recording and reproducing apparatus provided with an overdubbing function includes an error-correcting device employing error-correcting redundant signals recorded apart from the audio tracks. The apparatus functions to prevent error correction when the use of the redundant signals would cause the audio tracks to be corrected in error.

6 Claims, 11 Drawing Figures

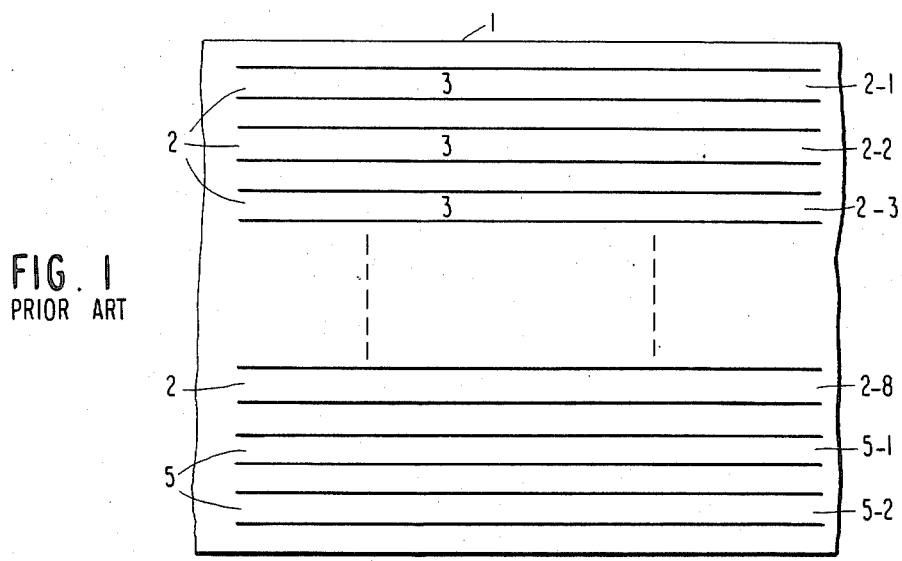
FIG. 1
PRIOR ART
FIG. 2
PRIOR ART
FIG. 3
PRIOR ART
FIG. 4
PRIOR ART
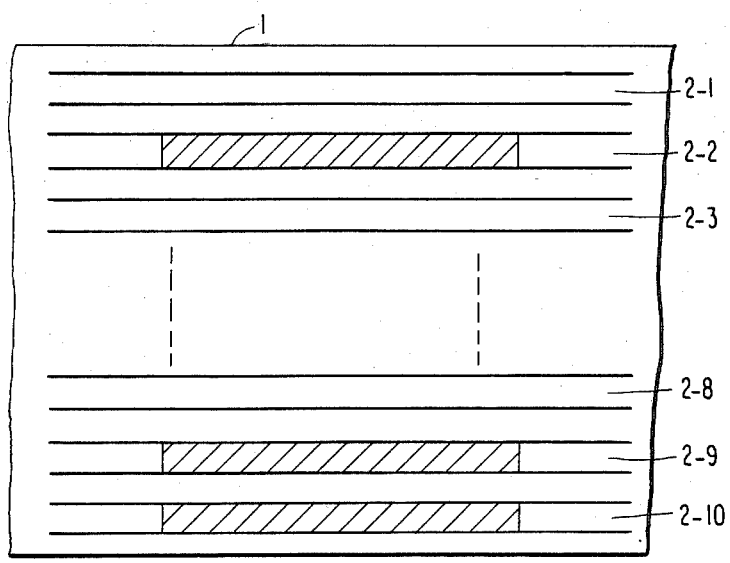

PCM RECORDING AND REPRODUCING APPARATUS

This is a continuation-in-part of application Ser. No. 438,552, filed Nov. 2, 1982, now abandoned.

BACKGROUND OF THE INVENTION

The present invention relates to a pulse code modulation (PCM) recording and reproducing apparatus, and more particularly to an error control system for a fixed-head multichannel PCM recording and reproducing apparatus.

PCM recording and reproducing apparatus are capable of recording audio signals as digital signals and reproducing recorded digital signals as audio signals.

SUMMARY OF THE INVENTION

One object of the present invention is to remove code errors when information is recorded on audio recording tape by employing error-correcting redundant signals recorded separately from the audio tracks.

Another object of the invention is to prevent error correction when the use of redundant signals would cause incorrect audio recording.

Tape formats for use with fixed-head multichannel PCM recording and reproducing apparatus for use with one or more tracks (hereinafter referred to as a "multichannel recorder") will be described with reference to the drawings.

BRIEF DESCRIPTION OF THE DRAWINGS

FIG. 1 is a view of a tape format used in a conventional multichannel recorder;

FIG. 2 is a diagram showing an overdubbing operation;

FIG. 3 is a diagram explaning an algorithm for generating error-correcting redundant signals $C_1$, $C_2$;

FIG. 4 is a diagram illustrating tape format in which error-detecting signals dn, frame synchronizing signals S, and status indication bits F are added in the direction of tape travel;

DETAILED DESCRIPTION OF THE PREFERRED EMBODIMENTS

Figure 5:
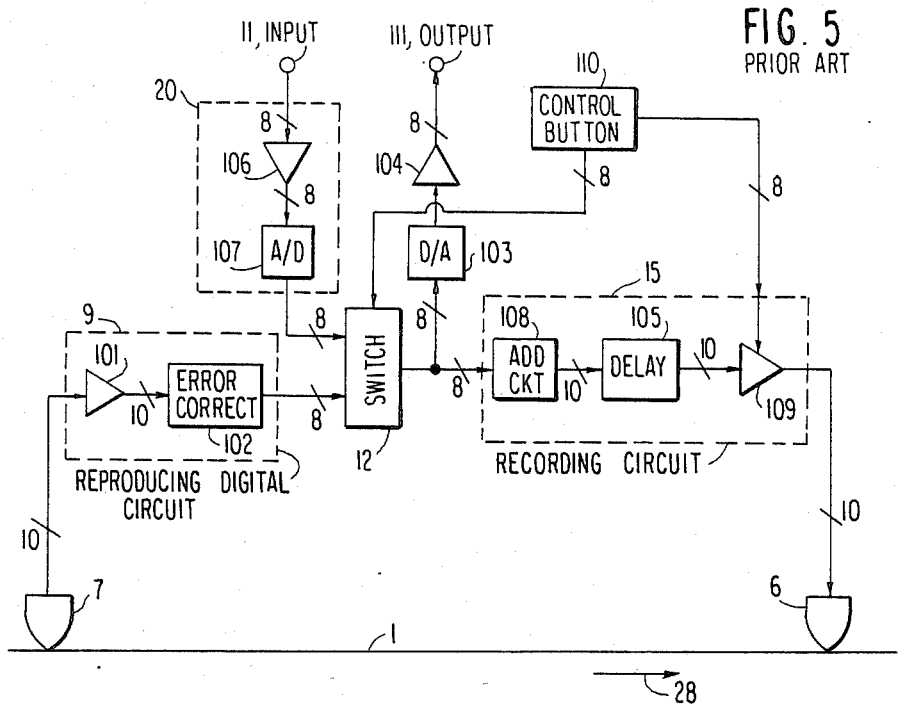
FIG. 5 is a block diagram of a tape transport system and a digital signal processing system in a conventional fixed-head multichannel PCM recorder.

FIG. 1 shows a recording format for multichannel recorder presented in AES preprint 1690 (H-5), October 1980. In FIG. 1, information tracks 2-1, 2-2, ... 2-8 are assigned respectively to channels of coded audio signals, and there are two additional tracks 5-1 and 5-2 for recording error-correcting redundant signals $C_1$, $C_2$ for correcting errors present on the eight tracks of the audio signals.

FIG. 3 shows the manner in which the redundant signals $C_1$, $C_2$ are generated. Four bits are picked up from each of the tracks 2-1 through 2-8 at transversely adjacent positions to produce items of information $a_1$ through $a_8$. The redundant signals $C_1$, $C_2$ are generated from the 4×8 bits based on the following equations:

$$C_1 = \sum_{i=1}^{8} a_i \alpha_i$$

$$C_2 = \sum_{i=1}^{8} a_i + C_1$$

In this equation $\alpha$ is an element in Galois fields and is a commonly known parameter used in coding theory. According to the present invention the above processing is successively performed.

FIG. 4 shows a tape format in a block arrangement in which there are added frame synchronizing signals S, status indication bits F, and error-detecting redundant signals dn in the direction of tape travel. More specifically, the frame synchronizing signals S serve to detect the starting ends of frames. The status indication bits or flags F are employed to record various conditions such as ON-OFF conditions of emphasis, whether there is companding, and a signal for mixing control.

A conventional reproducing process, particularly an error correcting process now will be described.

In FIG. 4, the error-detecting redundant signals dn are used to detect which track contains an error. Generally, a code having a high error-detecting capability known as a cycle redundancy checker (CRC) is used for error detection. The principle of this type of error detection is such that, as described in AES preprint 1690 (H-5) October 1980, page 6, when there is no error, the arithmetic process produces a remainder of 0, and when there is an error, the arithmetic process produces a remainder of nonzero. The error detecting process is described below.

First, syndromes $S_1$, $S_2$ are found from the following equations:

$$S_1 = \sum_{i=1}^{8} r_i \alpha_i + r_9$$

where $r_i$ is reproduced information, and when there is no error during reproduction, $r_i = a_i$ (i = 1 through 8), $r_9 = C_1$, and $r_{10} = C_2$. If there is no error with respect to all $r_i$, then $$S_1 = \sum_{i=1}^{8} a_i \alpha_i + C_1 = 0$$

$$S_2 = \sum_{i=1}^{8} a_i + C_1 + C_2 = 0$$

Therefore, it is found there is no error since the calculated syndromes are "0".

If there is one error, e.g., with respect to $r_2$ on the second track, $$r_2 = a_2 + e_2$$

and the syndromes $S_1$, $S_2$ are given by:

$$S_1 = \sum_{i=1}^{8} a_i \alpha_i + C_1 + e_2 \alpha_2 = e_2 \alpha_2$$

$$S_2 = \sum_{i=1}^{8} a_i + C_1 + C_2 + e_2 = e_2$$

The error value $e_2$ is found from the syndrome $S_2$, and the errror track position is found to be the second track by calculating $S_1/S_2$ to get $\alpha_2$. The result of detection by the previously calculating error-detecting code indicates that there is an error on the second track.

If there are two errors, e.g., with respect to $r_2$ on the second track and $r_4$ on the fourth track, $$r_2 = a_2 + e_2$$

$$r_4 = a_4 + e_4$$

and the syndromes $S_1$, $S_2$ are given by:

$$S_1 = e_2 \alpha_2 + e_4 \alpha_4$$

$$S_2 = e_2 + e_4$$

It has been found from the result of the previously calculated error-detecting code that there are errors on the second and fourth tracks, and the values of $r_2$, $r_4$ are known. Therefore, the error values $e_2$, $e_4$ are given by solving the above equations for $e_2$, $e_4$ as follows:

$$e_2 = \frac{S_2 \alpha_4 + S_1}{\alpha_2 + \alpha_4}$$

$$e_4 = \frac{S_2 \alpha_2 + S_1}{\alpha_2 + \alpha_4}$$

The errors can therefore be corrected.

The tape format arrangement described above has an ability to correct simultaneous errors present on up to two tracks.

A circuit arrangement of a conventional fixed-head multichannel PCM recorder now will be described.

FIG. 5 shows a tape transport system and a circuit of such a multichannel recorder (based on convention, the number of channels in a single connector line is shown by "/8" and "/10" in the Figure. FIG. 5 shows a multi-track recording head 6 (hereinafter referred to as a "recording head"), and a multitrack synchronizing playback head 7 (hereinafter referred to as a "playback head"). A tape 1 runs in the direction of the arrow 28. A reproducing digital circuit 9 has an amplifier 101 for amplifying an output from the playback head 7 and an error-correcting circuit 102 for correcting a code error in the amplified output. The corrected output from the error-correcting circuit 102 is delivered through a switch 12 and converted by a D/A converter 103 to an analog signal which is amplified by an audio amplifier 104 from which an audio signal is delivered to an output terminal 111. An audio signal applied to an input terminal 11 is converted by an input digital circuit 20 to a PCM signal. The input digital circuit 20 includes an audio amplifier 106 for amplifying the applied audio signal and an A/D converter 107 for converting the amplified audio signal to a PCM signal which is fed to the switch 12. A recording digital circuit 15 has an error-correcting-code adding circuit 108 for generating and adding an error-correcting redundant signal to the PCM signal from the switch 12, a digital delay 105 for delaying the combined signal for a prescribed time, and a recording circuit 109 for amplifying the delayed signal and recording the amplified signal through the recording head 6 on the tape 1.

The switch 12 and the recording circuit 109 are controlled by a control button 110.

Overdubbing operation will be described with reference to FIG. 2.

When the second channel is overdubbed, the shaded portion of the second channel is rerecorded. At this time, the redundant signals $C_1$, $C_2$ corresponding to the shaded portion are also required to be rerecorded.

In FIG. 5, during overdubbing operation, the digital signal in the second channel is supplied to the recording digital circuit 15 through the input digital circuit 20, while the digital signals in the other channels (first, third through eighth) are supplied to the recording digital circuit 15 through the reproducing digital circuit 9. If the information signal in the second channel is to be rerecorded, it has to be rerecorded together with the redundant signals $C_1$ and $C_2$. In this case, however, all information signals in the other channels are not required to be rerecorded at the same time. In a method in which all information signals in all channels are rerecorded in a rerecording operation, there is a greater possibility that the signals may be degraded, because the correct signals must be rerecorded. In view of this difficulty, it is desired to rerecord only aimed signals, the signal recorded in the second channel and the redundant signals $C_1$ and $C_2$ for instance.

Errors produced in magnetic recording are caused by flaws on the tape and coating irregularies of the magnetic material. The errors are classified into those errors which vary. The latter error types are fixed in position on the tape and those errors which are produced by dust particles attached to the tape or interference signal applied to the playback head and hence vary their position on the tape in each playback cycle.

When errors are produced on three tracks, i.e., first, third, and fourth tracks, while the information on the second track is being overdubbed according to the aforesaid signal processing method, the errors cannot be corrected since they are in excess of the error-correcting capabilities of the prior art methods. Therefore, error samples on the first, third, and fourth tracks are compensated for. For example, each of the error samples is replaced with the average of correct samples before and after the error sample, and the substituted sample is issued from the reproducing digital circuit 9. The reproduced output signals from the reproducing digital circuit 9 for the first, third through seventh tracks and the reproduced output signal from the input digital circuit 20 for the second track are combined to produce the redundant signals $C_1$, $C_2$ which are then recorded on the tape 1.

Figure 6:
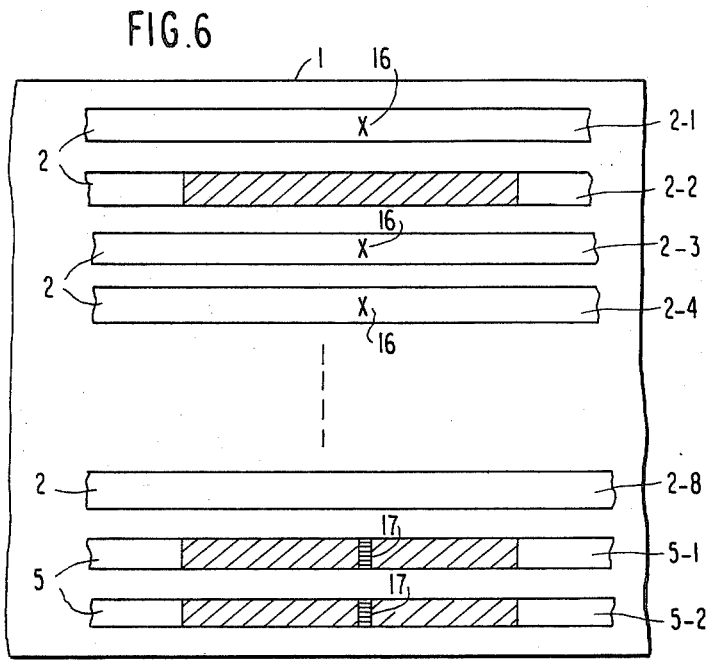
FIG. 6 is a diagram of a tape format illustrative of a conventional drawback.

FIG. 6 shows the manner in which the errors are compensated for and the redundant signals are produced in the above manner. Designated at 16 are error samples, and 17 redundant signals produced by replacing the error samples 16 with the averages of the adjacent correct samples and combining the substituted sample and the newly generated second-track signal. There will no problem if the samples 16 are in error again when this portion of the tape is played back again. However, if one of the samples 16 is reproduced correctly, i.e., if the first track is reproduced correctly, error-detecting codes d for the third and fourth tracks detect the errors, but no error is detected for the first track. As a consequence, two tracks suffer from errors, and the error-correcting signals $C_1$, $C_2$ are used for error correction. Since however the error-correcting signals $C_1$, $C_2$ are errorcorrecting redundant codes generated by using interpolated information on the first, third, and fourth tracks, the third and fourth tracks are corrected in error, and the reproduced output-signal generates a click sound which is troublesome in practical applications.

The above drawback of conventional multichannel recorders, the present invention resides in that if sample is compensated for and a signal is generated indicating that the sample is compensated for in a reproducing digital circuit, i.e., when a correction-inhibit signal is produced, then the error-correcting process is interrupted in the corresponding portion of the tape.

Figure 7:
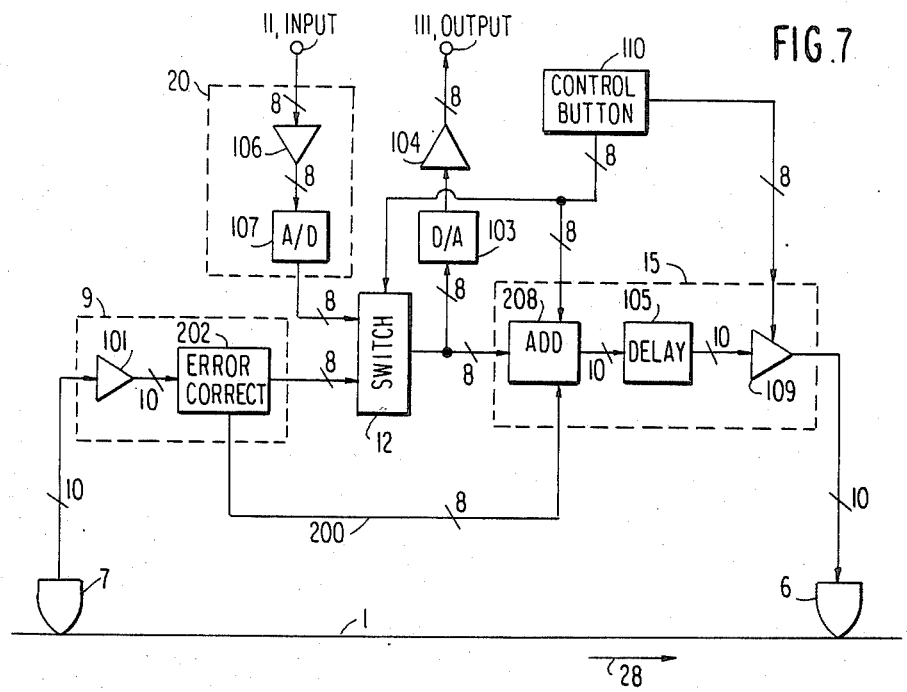
FIG. 7 is a block diagram of a signal processing system in a fixed-head multichannel PCM recorder according to the present invention.
Figure 8:
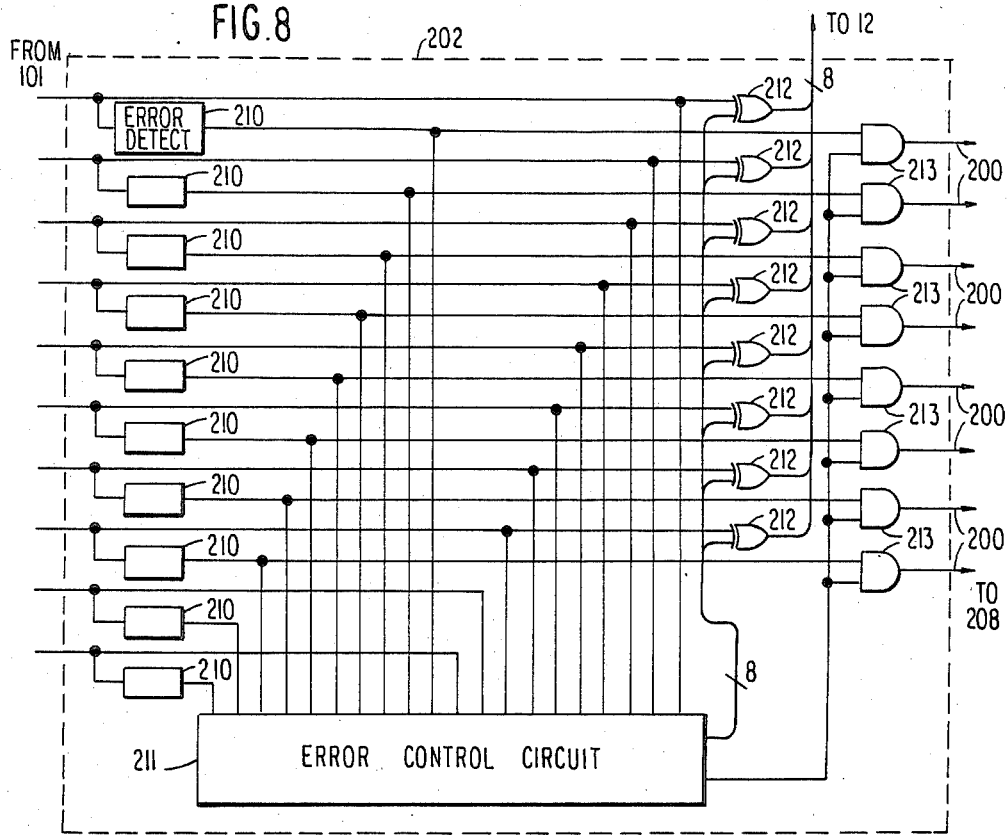
FIG. 8 is a block diagram of an error-correcting circuit 202.
Figure 9:
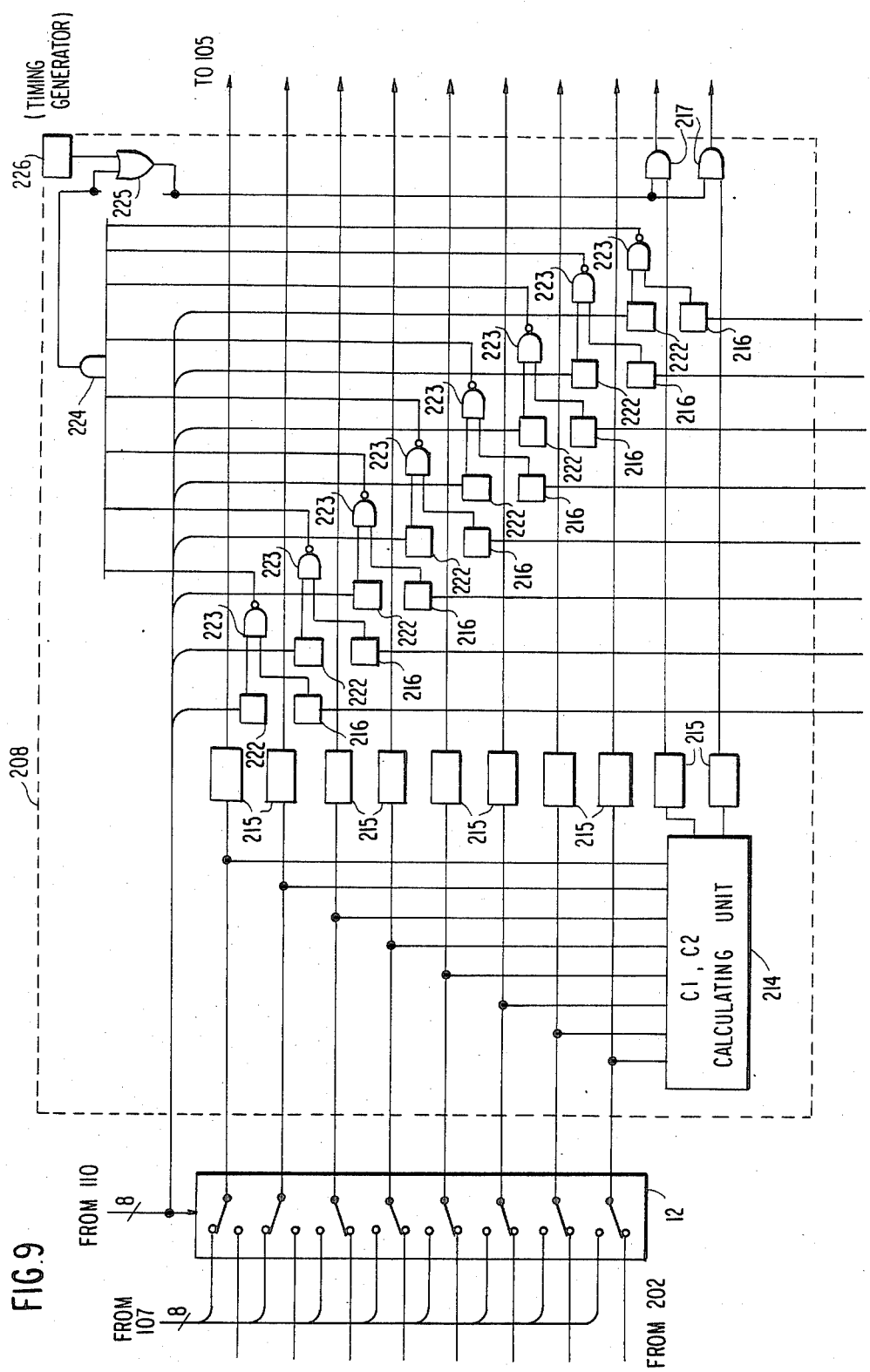
FIG. 9 is a block diagram of an error-correcting-code adding circuit 208.

A first embodiment of the present invention now will be described. Designated in FIG. 7 at 202 is an error-correcting circuit and 208 a circuit for adding error-correcting codes arranged in a block as shown in FIG. 4. When the error-correcting circuit 202 is in a correction-inhibit condition, track information with an error detected by an error-detecting code is delivered through signal lines 200 to the error-correcting-code adding circuit 208. FIGS. 8 and 9 show in detail the error-correcting circuit 202, the error-correcting-code adding circuit 208, and the signal lines 200.

The error-correcting circuit 202 shown in FIG. 8 includes error detectors 210 for decoding the error-detecting codes and detecting whether the reproduced signals are in error. Each of the error detectors 210 may be a commercially available CRC (type 9401 manufactured by Fairchild, for example). The error-correcting circuit 202 also includes a syndrome calculator and error control circuit 211, which is illustrated in detail in FIG. 10.

Figure 10:
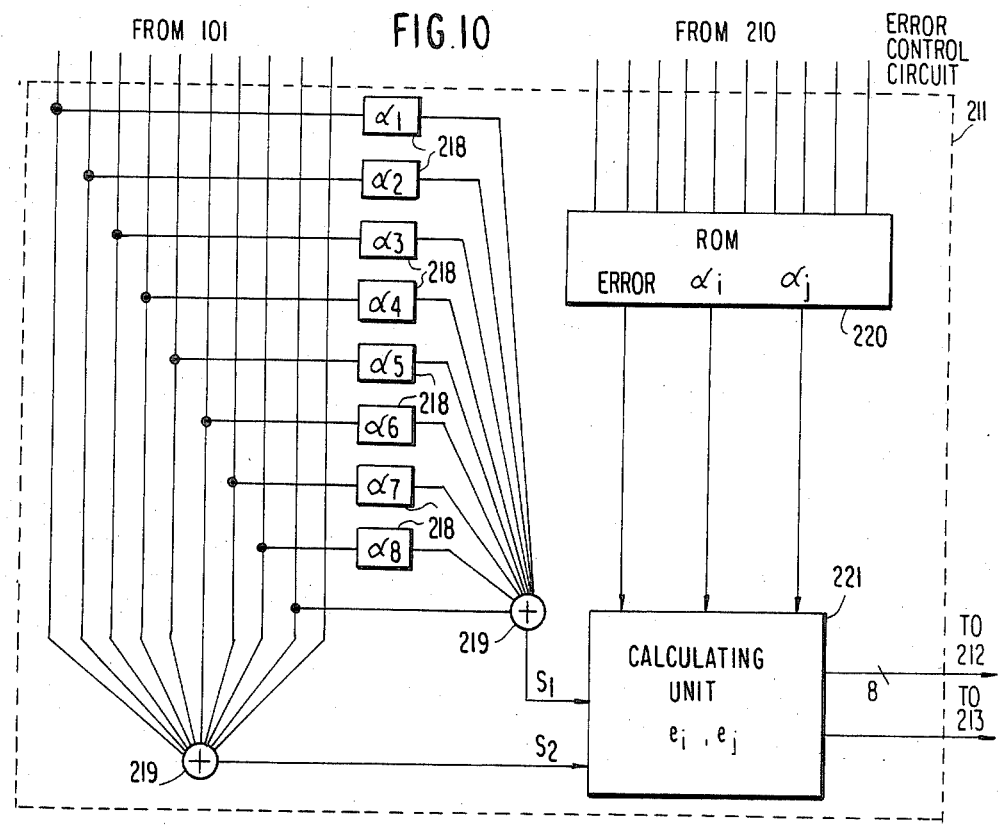
FIG. 10 is a block diagram of a syndrome calculator and error control circuit 211.

As shown in FIG. 10, the syndrome calculator and error control circuit 211 includes multipliers 218 for multiplying $\alpha_i$. Each of the multipliers 218 can easily be realized by a commerically available Read-Only memory ROM. The outputs from the multipliers 218 are totalled by an adder 219. A ROM 220 is supplied with results of error detection from the error detectors 210 for generating the total number of errors and $\alpha_i$ of error-bearing tracks. A caluclating unit 221 for calculating an error value $e_i$ for error correction delivers the calculated error value $e_i$ over the signal line of the corresponding track to error-correcting units 212, and also delivers a signal to gates 213 indicative of whether error correction is to be effected.

In FIG. 8, when the calculating unit 221 generates a correction-inhibit signal representing the fact that errors cannot be corrected since errors are in excess of error-correcting capabilities, the gates 213 pass the results or error detection from the error detectors 210. When the calculating unit 221 permits an error correction, the gates 213 prevent the signals from the error detectors 210 from passing and generates outputs "0" representing that there is no error. When one of the gates 213 generates an output "1", this output indicates that the information on the corresponding track contains an error and the error is to be compensated for.

Figure 11:
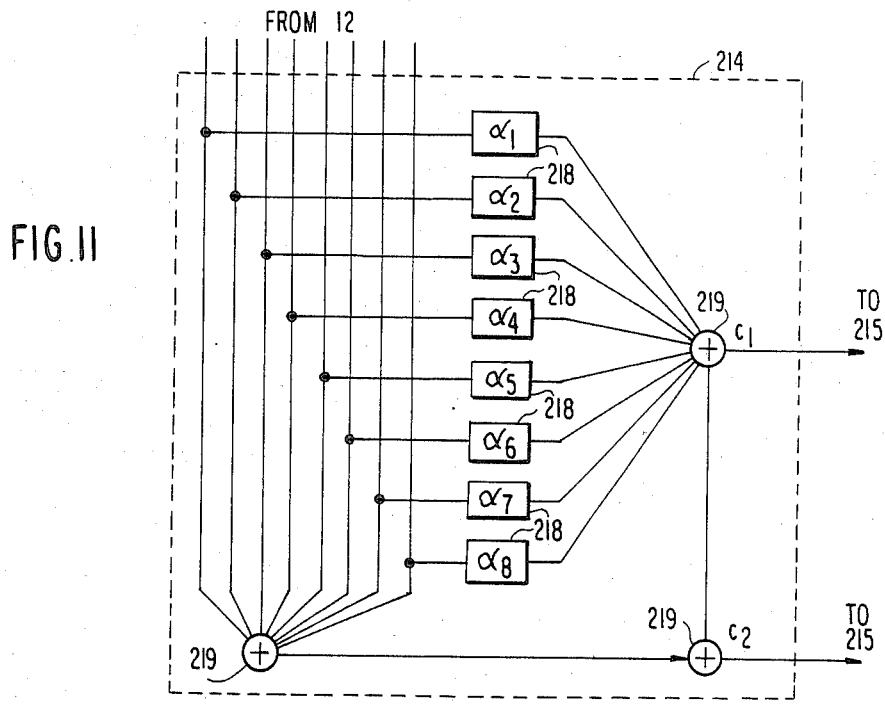
FIG. 11 is a block diagram of an errorcorrecting redundant signal calculating unit 214.

Designated in FIG. 9 at 214 is a $C_1$, $C_2$ calculating unit which is shown in detail in FIG. 11. The error-correcting-code adding circuit 208 of FIG. 9 includes error-detecting-code adding units 215 for calculating error-detecting redundant signals dn and adding the frame synchronizing signals S and the flags F. Each of the error-detecting-code adding units 215 may be a commercially available CRC generator such as type 9401 manufactured by Farchild. Delay circuits 216 are supplied with error information from the error-correcting circuits 202 over the signal lines 200 for delaying the error information for a prescribed period of time corresponding to the delay time of the reproduced signals in the error-correcting circuit 202, the switch 12, and the error-detecting-code adding units 215. Gates 217 serve to control the passage therethrough of the error-correcting redundant signals $C_1$, $C_2$. Gates 223 issue outputs "0" when the information on the track with an error detected therein is not overdubbed. When the gate 223 issues an output "0" for at least one of the eight tracks, a gate 224 closes the gates 217 to prevent the gates 217 from generating error-correcting redundant signals. At this time, the information $C_1$, $C_2$ is forcibly converted to error information. Delay circuits 222 serve to delay the overdubbing ON/OFF signal from the control button 110 for a prescribed period of time corresponding to the signal delay time in the switch 12 and the error-detecting-code adding units 215. With the foregoing processing arrangement, when an error is generated which cannot be corrected, the corresponding error-correcting redundant signal can forcibly be converted to an error.

When controlling the timing to close the gates 217 for issuing the frame synchronizing signals S, a signal from a frame synchronizing signal timing generator 226 is applied through a gate 225 to the gates 217 to open these gates 217. The frame synchronizing signals S can therefore be recorded correctly, while only the error-correcting redundant signals are in error, so that a successive code block will not be adversely affected.

According to another embodiment for intentionally making the error-correcting redundant signals erroneous, the frame synchronizing signals S for the redundant signals or the contents of the error-detecting redundant signals may be made erroneous. When the error-correcting redundant signals $C_1$, $C_2$ are brought into error, then two tracks are in error even if all track information is reproduced correctly, resulting in a limitation on the error-correcting ability. If the track information is partially in error, then the error sample is necessarily compensated for in the reproducing digital circuit 9.

Another embodiment for disabling the error-correcting ability employs one bit of the flag F as indicating that interpolation is performed upon overdubbing. With this embodiment, the error-correcting ability if forcibly interrupted in the reproducing digital reproduction.

As described above, the fixed-head multichannel recorder generates error-correcting redundant signals for a plurality of audio signal channels, and records the audio signal channels and the redundant signals in different tracks on a tape, and at the time of overdubbing a track, simultaneously rerecords the overdubbed track and the redundant-signal tape portion corresponding to the overdubbed track. When an error in excess of the error-correcting ability is produced in tape portions which are being simultaneously reproduced upon overdubbing, an error produced in the tape portions when they are reproduced again is recorded so as to exceed the error-correcting ability, so that an erroneous correction can be prevented which would be reproduced upon playback.

What is claimed is:

1. A PCM recording and reproducing apparatus comprising: means for initialy assigning a single track or a plurality of tracks on a recording medium per channel of an original audio signal and for recording the audio signal as a digital signal on said tracks; means for generating error-correcting redundant signals from the channels of audio signals and for subsequently recording the error-correcting redundant signals on a plularity of tracks different from said initial tracks; means for adding an error-detecting redundant signal to each of said subsequent tracks; means for rewriting the original audio signal in a certain channel and the corresponding errorcorrecting redundant signal in an overdubbing process in which a new audio signal is rerecorded in said certain channel while reproducing the original audio signal that has already been recorded; means for issuing an errorcorrection inhibit signal per track when an error in excess of a predetermined error-correcting ability is produced in a portion of a recording medium where said original audio signal is reproduced; and means for detecting a track where the signal is not rerecorded from the error-correction inhibit signals and for forcibly bringing the error-correcting redundant signal into error when at least one error-correction inhibit track is not recorded.

2. A PCM recording and reproducing apparatus according to claim 1, wherein said means for forcibly bringing the error-correcting redundant signal into error includes means for delaying the error-correction inhibit signal and a signal indicative of whether the audio signal is recorded or not for a period of time corresponding to a signal processing delay time for each track.

3. A PCM recording and reproducing apparatus according to claim 1 wherein said means for forcibly bringing the error-correcting redundant signal into error records frame synchronizing signals correctly.

4. A PCM recording and reproducing apparatus according to claim 2 wherein said means for forcibly bringing the error-correcting redundant signal into error records frame synchronizing signals correctly.

5. A PCM recording and reproducing apparatus according to claim 1, 2, 3 or 4, wherein said means for forcibly bringing the error-correcting redundant signal into error includes means for equalizing all of said error-correcting redundant signals and said errordetecting redundant signals to "0" or "1".

6. A PCM recording and reproducing apparatus according to claim 1 wherein said recording medium is magnetic tape.

* * * * *